3,166,054
ENGINE

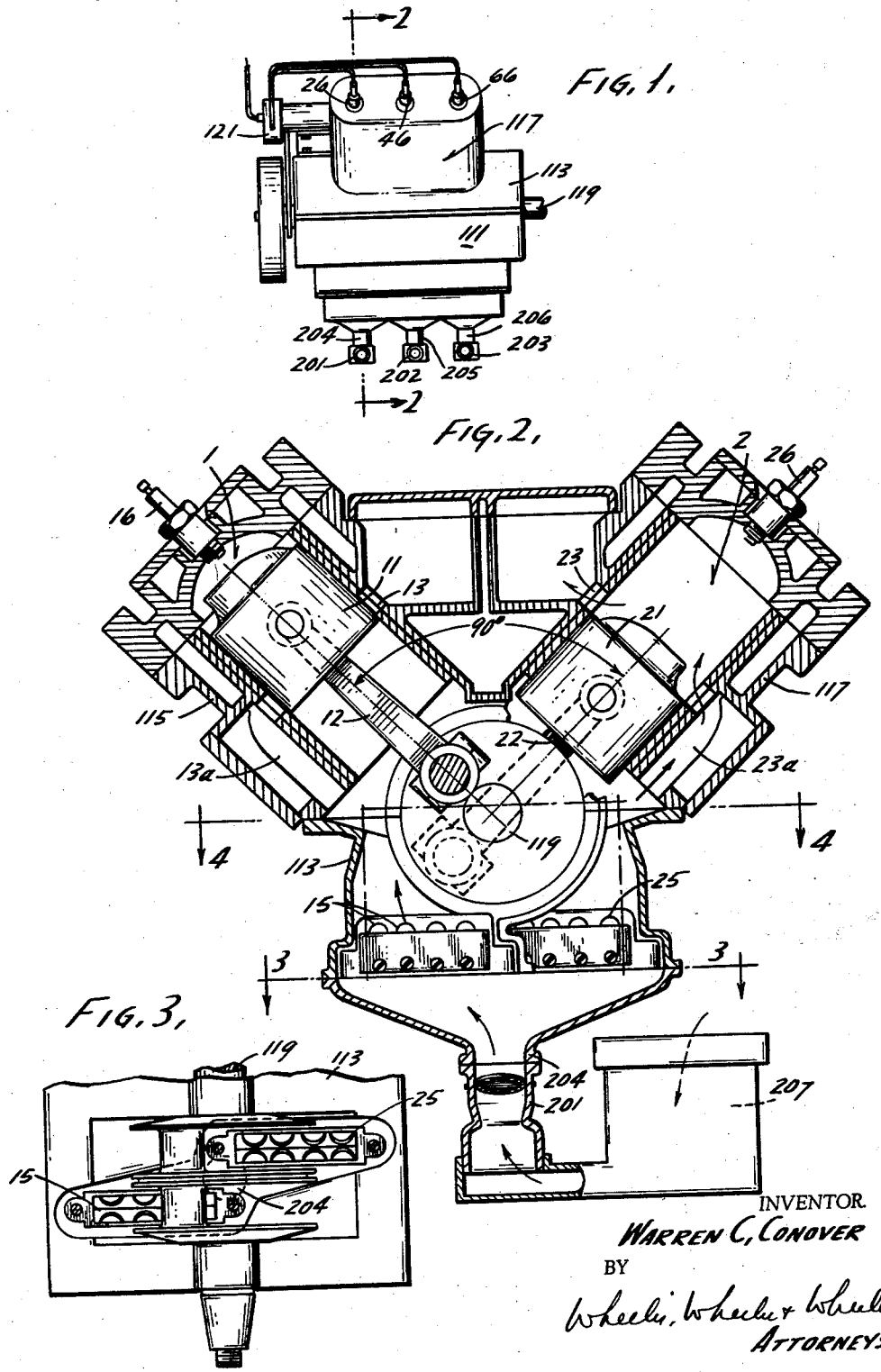

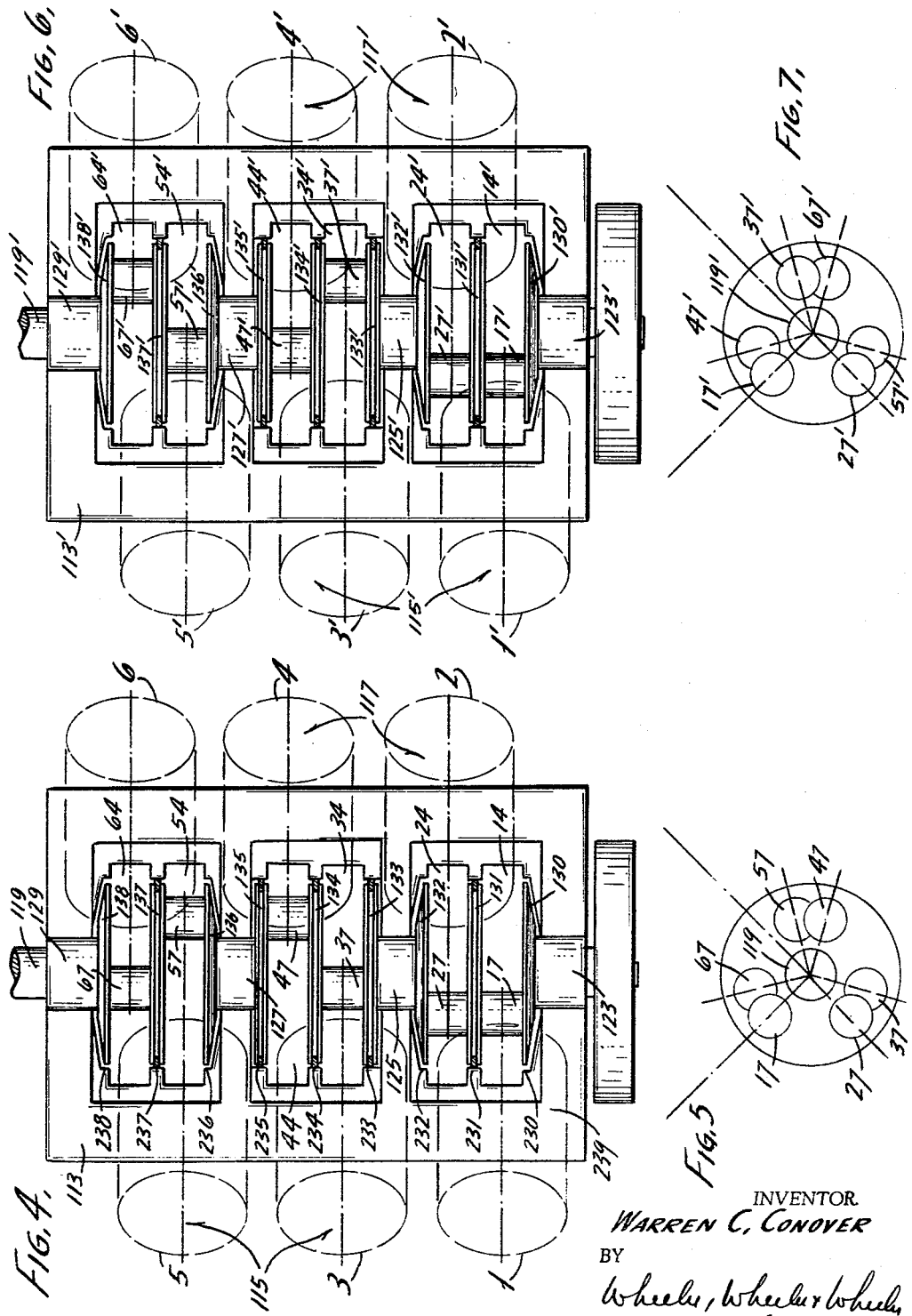

Warren C. Conover, Waukegan, Ill., assignor to Outboard Marine Corporation, Waukegan, Ill., a corporation of Delaware
Filed Sept. 18, 1962, Ser. No. 224,350
14 Claims. (Cl. 123—55)

The invention relates generally to multi-cylinder, internal combustion engines. More particularly, the invention relates to six cylinder, V engines having a 90 degree included angle between the cylinder banks which provide the V form.

The invention provides a 90 degree V, internal combustion engine including two banks of three cylinders each wherein adjacent pairs of cylinders are oppositely acting, i.e., are alternately fired at intervals corresponding to 180 degrees of crankshaft rotation. Such an arrangement is specifically advantageous with a two stroke engine wherein each cylinder has an associated separate crank case through which a combustion air-fuel mixture is pumped by reason of piston reciprocation. More specifically, the arrangement permits use of a three throat carburetor or other combustion air intake wherein each throat serves one pair of adjacent oppositely acting cylinders. As a result, each throat operates to pass the main portion of a charge of combustion air at intervals corresponding to 180 degrees of crankshaft rotation.

The invention also provides, in association with the above features, an engine wherein the cylinders of each bank are fired at intervals corresponding to 120 degrees of crankshaft rotation, thereby obtaining balanced operation in each bank, and consequent overall balance.

The invention further provides firing orders wherein the cylinder banks alternately fire at even intervals corresponding to 60 degrees of crankshaft rotation, thereby distributing as uniformly as possible the flow of power to the crankshaft and flywheel. In addition, as one of the cylinders is fired for each 60 degrees of crankshaft rotation and as the firing in each bank occurs at intervals corresponding to 120 degrees of crankshaft rotation, the exhaust flow is distributed as uniformly as possible both when utilizing a single exhaust manifold and when the exhaust is discharged from each bank to a separate manifold.

To carry out these objectives, the crankshaft is designed to effect the desired action in the cylinders. In the preferred embodiment, each pair of crank pins associated with adjacent cylinders in each bank are angularly displaced 90 degrees from each other, while each pair of such crank pins is displaced 120 degrees from each of the other two pairs of crank pins. As will be described hereinafter, the advantages of the invention can be obtained utilizing at least two different crankshaft configurations and two respectively associated firing orders.

Other objects and advantages of the invention will become known by reference to the following description and the accompanying drawings of the invention wherein:

FIGURE 1 is a side view of an engine incorporating various of the features of the invention;

FIGURE 2 is an enlarged sectional view taken generally along line 2—2 of FIGURE 1;

FIGURE 3 is a fragmentary sectional view taken generally along line 3—3 of FIGURE 1;

FIGURE 4 is a partially diagrammatic sectional view taken generally along line 4—4 of FIGURE 1 and showing one embodiment of a crankshaft providing various of the features of the invention;

FIGURE 5 is a partially diagrammatic view illustrating the arrangement of the crank pins associated with the crankshaft shown in FIGURE 4;

FIGURE 6 is a view similar to FIGURE 4 showing a second embodiment of a crankshaft providing various of the features of the invention; and FIGURE 7 is a partially diagrammatic view illustrating the arrangement of the crank pins associated with the crankshaft shown in FIGURE 6.

The engine 111 shown in FIGURES 1, 2, and 3 conventionally includes a V type engine block 113 including two cylinder banks 115 and 117 disposed at an included angle of 90 degrees to each other. Each of the cylinder banks 115 and 117 includes three cylinders in aligned series with engine bank 115 including cylinders 1, 3, and 5, and with engine bank 117 including cylinders 2, 4, and 6 in respective generally adjacent opposing relation to cylinders 1, 3, and 5. Each of the cylinders 1, 2, 3, 4, 5, and 6 has movable therein respective pistons (only pistons 11 and 21 being shown in the drawings in FIGURE 2), each of which pistons is pivotally connected to respective separate piston rods (only piston rods 12 and 22 being shown in the drawings in FIGURE 2). In turn, the piston rods are each connected to a common crankshaft 119.

As various of the advantages obtained by the disclosed invention are generally related to two-stroke, spark ignition engines, each of the cylinders 1, 2, 3, 4, 5, and 6 includes an exhaust port (only exhaust ports 13 and 23 being shown in the drawings in FIGURE 2), and a generally diametrically oppositely located transfer port (only transfer ports 13a and 23a being shown in the drawings in FIGURE 2), communicating with respective crankcases 14, 24, 34, 44, 54, and 64 (see FIGURE 4) which extend from the respective cylinders 1, 2, 3, 4, 5, and 6 and which are generally closed except for respective valved ports (only ports 15 and 25 being shown in the drawings in FIGURE 3) through which a combustion air or combustion air-fuel mixture is introduced. As will be seen, one specific advantage of the disclosed engine configuration is its applicability for use with either a single three throat carburetor, or other combustion air intake, or with three separate carburetors, or other combustion air intakes, rather than with separate throats or carburetors for each crankcase. Accordingly, there is shown in FIGURE 1 three separate combustion-air intakes 201, 202, and 203, each including respective throats 204, 205, and 206. If desired, throats 204, 205, and 206 could connect with a single combustion air supply manifold preferably provided with an air cleaner as shown at 207 in FIGURE 2. It is broadly immaterial to the present invention whether the air is carbureted at the manifold or in the respective air intakes or by direct fuel injection into the respective cylinders.

Unless the operation is by compression-induced or hot spot ignition, according to the Diesel principle, suitable ignition means is provided including a distributor 121 (see FIGURE 1) which is connected with respective spark plugs (only plugs 16 and 26 being shown in FIGURE 2 and plugs 26, 46, and 66 being shown in FIGURE 1) located in cylinders 1, 2, 3, 4, 5, and 6, whereby the firing orders, still to be described, can be obtained.

Although various arrangements can be employed, in the specifically disclosed construction, shown in FIGURE 4, the crankshaft 119 is journaled in the engine block at locations 123, 125, 127, and 129 and includes disc-like throws 130 through 138, inclusive, which co-operate with cylindrical wall portions 230 through 238, inclusive, in a crankcase part 239 of the engine block 113 to define the separate crankcases 14, 24, 34, 44, 54, and 64. The crankshaft 119 shown in FIGURE 4 also includes crank pins 17, 27, 37, 47, 57, and 67 which are supported by the disc-like throws and to which are respectively connected, in any suitable manner, the associated piston rods.

The crank pins are arranged on the crankshaft 119, shown in FIGURES 4 through 7, so that each pair of generally adjacent opposing cylinders, i.e., cylinders 1 and 2, 3 and 4, and 5 and 6, are oppositely acting, i.e., fire at intervals corresponding to 180 degrees of crankshaft rotation, and so that one cylinder is fired for every 60 degrees of crankshaft rotation alternately from each bank, with the cylinders in each bank firing at even intervals, i.e., for each 120 degrees of crankshaft rotation. The arrangement of the crank pins to provide for oppositely acting pairs of cylinders, permits the association with each pair of cylinders of a single throat from a multi-throat carburetor, or other combustion air intake. Thus each carburetor or throat serves to pass a major portion of a combustion air or combustion-air-to-fuel mixture charge at intervals corresponding to 180 degrees of crankshaft rotation.

At least two crankpin arrangements, and associated firing orders, can be employed. In the embodiment shown in FIGURES 4 and 5, the crank pin 17 can be considered as establishing a reference mark relative to which the other crank pins are offset about the axis of the crankshaft 119. As usual all crank pins are at like radius. Specifically, crank pin 27 is angularly displaced from crank pin 17 by approximately 270 degrees when viewed in the clockwise direction as seen in FIGURE 5; crank pin 37 is angularly displaced from crank pin 17 by about 240 degrees in the clockwise direction; crank pin 47 is angularly displaced from crank pin 17 by approximately 150 degrees in the clockwise direction; crank pin 57 is angularly displaced from crank pin 17 by about 120 degrees in the clockwise direction; and crank pin 67 is angularly displaced from crank pin 17 by about 30 degrees in the clockwise direction. Thus, as can be readily observed, the respective crank pins 17 and 27, 37 and 47, and 57 and 67 for each pair of oppositely acting cylinders 1 and 2, 3 and 4, and 5 and 6, are located at 90 degrees from each other. When using the crankshaft 119 with the crank pin arrangement just described, the distributor is adjusted to fire the cylinders in the following order: 1-6-3-2-5-4.

In the embodiment shown in FIGURES 6 and 7, the crank pin 17' can be considered as establishing a reference mark relative to which the other crank pins are offset angularly about the axis of the crankshaft 119'. Specifically, crank pin 27' is angularly displaced from crank pin 17' by approximately 270 degrees when viewed in the clockwise direction as seen in FIGURE 7; crank pin 37' is angularly displaced from crank pin 17' by approximately 120 degrees in the clockwise direction; crank pin 47' is angularly displaced from crank pin 17' by approximately 30 degrees in the clockwise direction; crank pin 57' is angularly displaced from crank pin 17' by approximately 240 degrees in the clockwise direction; and crank pin 67' is angularly displaced from crank pin 17' by approximately 150 degrees in the clockwise direction. Thus, as in the embodiment shown in FIGURES 4 and 5, the respective crank pins 17' and 27', 37' and 47', and 57' and 67' for each pair of oppositely acting cylinders 1' and 2', 3' and 4', and 5' and 6', are located at 90 degrees from each other. In operation, the embodiment shown in FIGURES 6 and 7 is employed with an engine having a firing order of 1-4-5-2-3-6.

Both of the disclosed crankshaft configurations permit operation of a 90 degree V six cylinder engine to that adjacent pairs of cylinders including one cylinder in each bank are alternately acting, permitting supply of combustion air to the associated crankcases through a single carburetor throat. In addition, use of the disclosed crankshaft configurations permits firing every 60 degrees of crankshaft rotation and firing, in each bank, at 120 degrees of crankshaft rotation. Thus, there is provided a crankshaft configuration for a 90 degree V six engine affording balanced operation and permitting use of three separate carburetor throats, each supplying a charge of combustion air or a charge of combustion air-fuel for every 180 degrees of crankshaft rotation.

Various of the features of the invention are set forth in the following claims.

What is claimed is:

1. A V type internal combustion engine including a first cylinder bank including, in series, first, third and fifth cylinders, a second cylinder bank including, in series, second, fourth, and sixth cylinders, said banks being disposed at an angle of 90 degrees relative to each other, a separate piston reciprocably movable in each of said cylinders, a piston rod extending from each of said pistons, a crankshaft including means connecting said piston rods to said crankshaft for effecting, with respect to crankshaft rotation, oppositely directed piston movement throughout the piston stroke in said first and second cylinders, in said third and fourth cylinders, and in said fifth and sixth cylinders, and for effecting balanced operation of the cylinders in each of said banks.

2. A V type internal combustion engine including a first cylinder bank including, in series, first, third, and fifth cylinder, a second cylinder bank including, in series, second, fourth and sixth cylinders, said banks being disposed at an angle of 90 degrees relative to each other, a separate piston reciprocably movable in said cylinders, a crankshaft comprising means including a piston rod connecting each of said pistons with said crankshaft for sequentially disposing said pistons adjacent top dead center alternately from each bank at intervals of 60 degrees of crankshaft rotation, for disposing one of said fourth and sixth pistons adjacent top dead center next after arrival of said first cylinder at top dead center, for disposing one of said third and fifth pistons adjacent top dead center next after arrival of said second cylinder at top dead center, for disposing one of said second and sixth pistons adjacent top dead center next after arrival of said third cylinder at top dead center, for disposing one of said first and fifth pistons adjacent top dead center next after arrival of said fourth cylinder at top dead center, for disposing one of said second and fourth pistons adjacent top dead center next after arrival of said fifth cylinder at top dead center, and for disposing one of said third and first pistons adjacent top dead center next after arrival of said sixth cylinder at top dead center.

3. A V type internal combustion engine including a first cylinder bank including, in series, first, third, and fifth cylinders, a second cylinder bank including, in series, second, fourth, and sixth cylinders, said banks being disposed at an angle of 90 degrees relative to each other, a separate piston reciprocably movable in each of said cylinders, a crankshaft, a separate piston rod extending from each of said pistons to said crankshaft, and means for sequentially disposing the pistons respectively associated with said first, sixth, third, second, fifth, and fourth cylinders adjacent top dead center at intervals corresponding to 60 degrees of crankshaft rotation and for sequentially firing said first, sixth, third, second, fifth, and fourth cylinders when their respectively associated pistons are adjacent top dead center.

4. A V type internal combustion engine including a first cylinder bank including, in series, first, third, and fifth cylinders, a second cylinder bank including, in series, second, fourth, and sixth cylinders, said banks being disposed at an angle of 90 degrees relative to each other, a separate piston reciprocably movable in each of said cylinders, a crankshaft, a separate piston rod extending from each of said pistons to said crankshaft, and means for sequentially disposing the pistons respectively associated with said first, fourth, fifth, second, third and sixth cylinders adjacent top dead center at intervals corresponding to 60 degrees of crankshaft rotation and for sequentially firing said first, fourth, fifth, second, third and sixth cylinders when their respectively associated pistons are adjacent top dead center.

5. A six cylinder, V-type, two cycle, internal combustion engine comprising an engine block including a first cylinder bank including, in aligned series, first, third, and fifth cylinders, a second cylinder bank including, in aligned series, second, fourth, and sixth cylinders in respectively generally adjacently opposing position to said first, third, and fifth cylinders, said second bank being disposed at an included angel of 90 degrees relative to said first bank, and a crankshaft having, in series, first, second, third, fourth, fifth and sixth crank pins, said pins being connected to said pistons operable respectively in said first, second, third, fourth, fifth, and sixth cylinders, said second crank pin being angularly offset from said first crank pin by 270 degrees in one rotative direction, said third crank pin being angularly offset from said first pin by 240 degrees in said one rotative direction, said fourth crank pin being angularly offset from said first pin by 150 degrees in said one rotative direction, said fifth crank pin being angularly offset from said first pin by 120 degrees in said one rotative direction, and said sixth crank pin being angularly offset from said first pin by 30 degrees in said one rotative direction.

6. An engine in accordance with claim 5 wherein said engine block includes a crankcase part having generally cylindrical wall portions located between adjacent cylinders and said crankshaft includes disc-shaped throws at least partially supporting each of said crank pins and co-operating with said wall portions to define a separate crankcase for each of said cylinders and to prevent gaseous flow between adjacent crankcases.

7. A six cylinder, V-type, two cycle, internal combustion engine comprising an engine block including a first cylinder bank including, in aligned series, first, third, and fifth cylinders, a second cylinder bank including, in aligned series, second, fourth, and sixth cylinders in respectively generally adjacently opposing position to said first, third, and fifth cylinders, said second bank being disposed at an included angle of 90 degrees relative to said first bank, and a crankshaft having, in series, first, second, third, fourth, fifth, and sixth crank pins, said pins being connected to pistons operable respectively in said first, second, third, fourth, fifth, and sixth cylinders, said second crank pin being angularly offset from said first crank pin by 270 degrees in one rotative direction, said third crank pin being angularly offset from said first pin by 120 degrees in said one rotative direction, said fourth crank pin being angularly offset from said first pin by 30 degrees in said one rotative direction, said fifth crank pin being angularly offset from said first pin by 240 degrees in said one rotative direction, and said sixth crank pin being angularly offset from said first crank pin by 150 degrees in said one rotative direction.

8. An engine in accordance with claim 7 wherein said engine block includes a crankcase part having generally cylindrical wall portions located between adjacent cylinders and said crankshaft includes disc-shaped throws at least partially supporting each of said crank pins and co-operating with said wall portions to define a separate crankcase for each of said cylinders and to prevent gaseous flow between adjacent crankcases.

9. A V type internal combustion engine including a first cylinder bank including, in aligned series, first, third, and fifth cylinders, a second cylinder bank including, in series, second, fourth, and sixth cylinders, said second bank being disposed at an angle of 90 degrees relative to said first bank, a separate crankcase extending from each of said cylinders and being closed except for a transfer passage adapted for communication with the associated cylinder, and pressure responsive valve means for admitting combustion air, a separate piston reciprocably movable in each of said cylinders, a separate piston rod extending from each of said pistons, a crankshaft extending through said crankcases and including means connecting said piston rods to said crankshaft for effecting, with respect to crankshaft rotation, opposite action of said first and second cylinders, of said third and fourth cylinders, and of said fifth and sixth cylinders, and for effecting balanced operation of the cylinders in each of said banks, and a separate combustion air intake communicating with said pressure responsive valve means associated with said crankcases extending from each of a first pair of said cylinders including said first and second cylinders, a second pair of said cylinders including said third and fourth cylinders, and a third pair of said cylinders including said fifth and sixth cylinders.

10. A V type internal combustion engine including a first cylinder bank including, in series, first, third and fifth cylinders, a second cylinder bank including, in series, second, fourth, and sixth cylinders, said banks being disposed at an angle of 90 degrees relative to each other, a separate piston reciprocably movable in each of said cylinders, a piston rod extending from each of said pistons, a crankshaft including means connecting said piston rods to said crankshaft for effecting, with respect to crankshaft rotation, oppositely directed piston movement throughout the piston stroke in said first and second cylinders, in said third and fourth cylinders, and in said fifth and sixth cylinders, and for effecting balanced operation of the cylinders in each of said banks, and means for supplying combustion air to said cylinders in sequence corresponding to, and prior to, arrival of the respective pistons at top dead center.

11. A crankshaft having, in series, a first, second, third, fourth, fifth, and sixth crank pin, each pin being disposed in parallel relation to the rotational axis of said crankshaft, said first and second pins being spaced substantially at 90 degrees from each other, said third and fourth pins being spaced substantially at 90 degrees from each other, said fifth and sixth pins being spaced substantially at 90 degrees from each other, said first, third, and fifth pins being spaced substantially at 120 degrees from each other, and said second, fourth, and sixth pins being spaced substantially at 120 degrees from each other.

12. A crankshaft in accordance with claim 11 including disk-shaped throws connecting the adjacent ends of said first and second crank pins, of said third and fourth crank pins, and of said fifth and sixth crank pins.

13. A crankshaft having, in series, a first, second, third, fourth, fifth, and sixth crank pin, each pin being disposed in parallel relation to the rotational axis of said crankshaft, said second crank pin being located relative to said first crank pin at an angle of 270 degrees measured in one rotative direction about the crankshaft axis, said third crank pin being located relative to said first crank pin at an angle of 240 degrees measured in said one rotative direction, said fourth crank pin being located relative to said first crank pin at an angle of 150 degrees measured in said one rotative direction, said fifth crank pin being located relative to said first crank pin at an angle of 120 degrees measured in said one rotative direction, and said sixth crank pin being located relative to said first crank pin at an angle of 30 degrees measured in said one rotative direction.

14. A crankshaft having, in series, a first, second, third, fourth, fifth, and sixth crank pin, each pin being disposed in parallel relation to the rotational axis of said crankshaft, said second crank pin being located relative to said first crank pin at an angle of 270 degrees measured in one rotative direction about the crankshaft axis, said third crank pin being located relative to said first crank pin at an angle of 120 degrees measured in said one rotative direction, said fourth crank pin being located relative to said first crank pin at an angle of 30 degrees measured in said one rotative direction, said fifth crank pin being located relative to said first crank pin at an angle of 240 degrees measured in said one rotative direction, and said sixth crank pin being located relative to said first crank pin at an angle of 150 degrees measured in said one rotative direction.

References Cited in the file of this patent

UNITED STATES PATENTS

| | | |
|---|---|---|
| 2,973,752 | Torre | Mar. 7, 1961 |
| 3,105,474 | Kiekhaefer | Oct. 1, 1963 |

FOREIGN PATENTS

| | | |
|---|---|---|
| 935,516 | Germany | Nov. 24, 1955 |